UNITED STATES PATENT OFFICE.

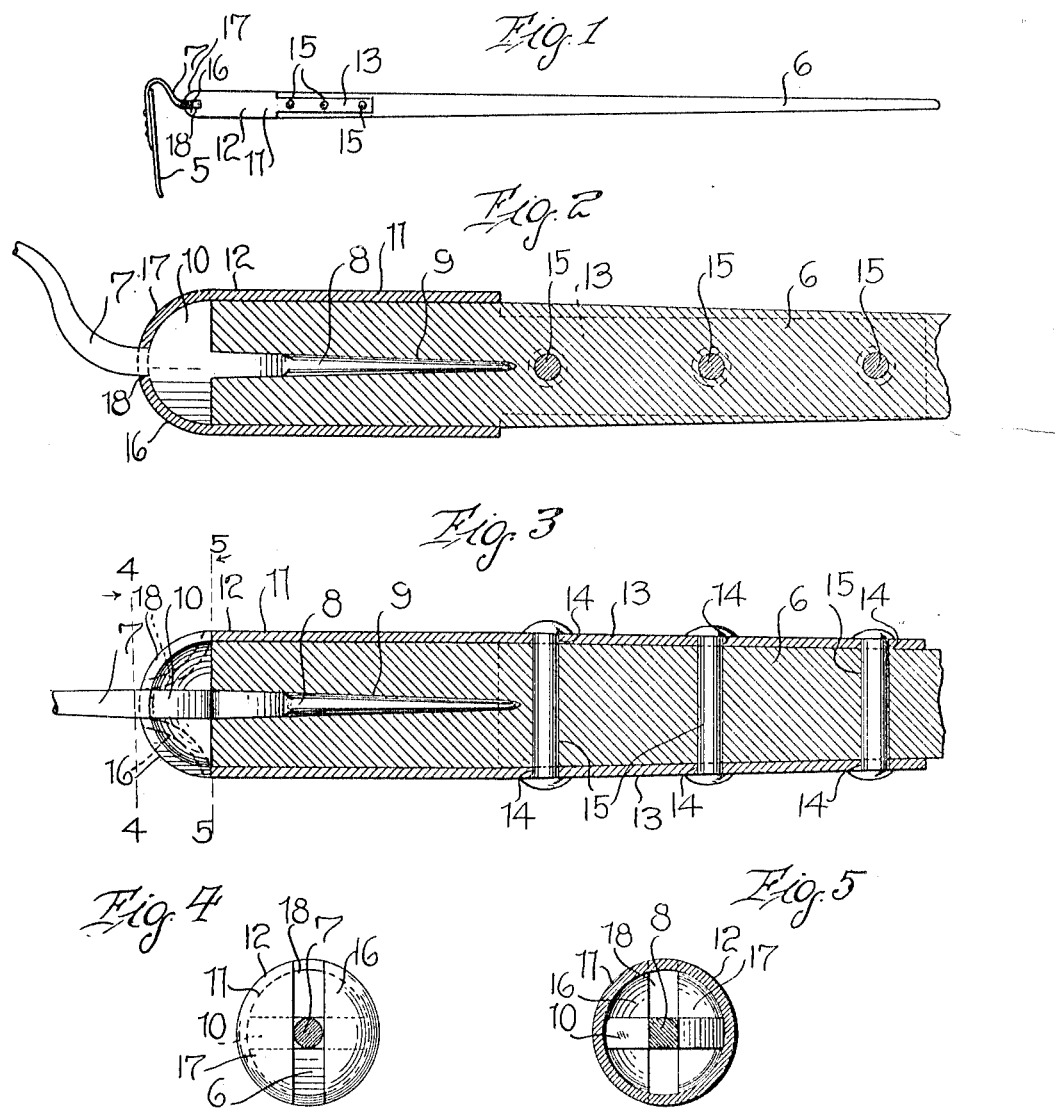

ROBERT E. ALCORN, OF LAKE VILLAGE, ARKANSAS.

TOOL-HANDLE CONNECTION.

1,105,599.     Specification of Letters Patent.     Patented Aug. 4, 1914.

Application filed July 23, 1913. Serial No. 780,826.

*To all whom it may concern:*

Be it known that I, ROBERT E. ALCORN, a citizen of the United States, residing at Lake Village, in the county of Chicot and State of Arkansas, have invented certain new and useful Improvements in Tool-Handle Connections, of which the following is a specification, reference being had to the accompanying drawings.

This invention relates to certain improvements in tool handle connections and has relation more particularly to a device of this general character as applied preferably to agricultural implements and the object of the invention is to provide a device of this character having means of a novel and improved character whereby connection is afforded possessing a maximum degree of strength and durability.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a side elevation view of a complete hoe constructed according to my invention; Fig. 2 is an enlarged longitudinal vertical sectional view through the structure which constitutes my invention; Fig. 3 is a horizontal sectional view through the structure shown in Fig. 2; Fig. 4 is a transverse vertical sectional view on the line 4—4 of Fig. 3; and Fig. 5 is a transverse vertical sectional view on the line 5—5 of Fig. 3.

In these drawings, in which similar reference characters correspond with similar parts throughout the several views, the device which constitutes my invention is shown in connection with a hoe blade 5 and hoe handle 6. The forward portion of the hoe shank 7 may be of any ordinary or preferred construction, and may be secured to the blade 5 in any proper way, the rear end thereof being preferably of rectangular cross section and being tapered rearwardly and pointed at its rear end, so as to provide a tang 8, which is adapted to be driven into the recess or socket 9 of the hoe handle 6, and thus to be non-rotatably engaged with said handle. The shank 7 is provided with a shouldered or enlarged portion 10, which preferably comprises two oppositely extending shoulders which are approximately equal in width to the major width of the tang 8. These shoulders are adapted to fit snugly against the socketed end of the handle 6 when the tang 8 is seated in the socket 9.

In order to prevent disengagement from or relative movement of the tang 8 from the handle member 6, I provide a combined ferrule and keeper member 11 which comprises a tubular element or ferrule 12 having a pair of spaced and substantially parallel arms 13 extending rearwardly from the rear opening thereof, said arms 13 being provided with opposite apertures 14 which are adapted to receive rivets, screws or other suitable securing means 15. The forward end of the tubular element 12 is formed with an upwardly and inwardly curved flange 16 and a downwardly and inwardly curved flange 17, these flanges being spaced apart, so as to provide therebetween a horizontally extending slot 18, which is of such size and shape as to allow the enlarged portion 10 of the tool shank to be passed therethrough when the ferrule is turned at an angle of 90 degrees from its normal position relative to said shank, but will not pass through said aperture 18 when the parts are in their normal positions. It will be seen that the shoulders 10 rest snugly against the end of the handle, while the lower and upper flanges 16 and 17 respectively fit tightly against the forward surfaces of said shoulders and co-act therewith for holding the shank rigid with the handle, while preventing movement of the tang in the socket; while the rivets 15 prevent longitudinal movement of the socket relative to the handle. The arms 13 add great strength and rigidity to the tool at the point of greatest lateral stress, where tools of ordinary construction usually break.

It is thought to be obvious that by the provision of the slot 18 that means are provided whereby the ferrule may be applied over the handle at the same time the tang is being driven therein.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claim.

I claim:

A device of the character described including a shank provided with a tang adapted to be inserted within the end portion of a handle and having laterally directed oppositely extended shoulders adapted to abut the end face of the handle in which the tang is directed and terminating adjacent the periphery thereof, and a ferrule of substantially the same length as the shank and provided with a slot in its head through which the tang and shoulders may be passed, the configuration of the head of the ferrule being such as to closely contact with the outer faces of the shoulders, the inner end of such ferrule being provided with oppositely disposed longitudinally directed arms and means common to both of such arms and adapted to be directed through the handle for holding the ferrule against displacement.

In testimony whereof I hereunto affix my signature in the presence of two witnesses.

ROBERT E. ALCORN.

Witnesses:
H. C. SAWYER,
WILLIAM KRITEN,

---

Copies of this patent may be obtained for five cents each, by addressing the "Commissioner of Patents, Washington, D. C."